US 6,435,331 B1

(12) United States Patent
Olson et al.

(10) Patent No.: US 6,435,331 B1
(45) Date of Patent: Aug. 20, 2002

(54) DYNAMIC GAP ESTABLISHING SYNCHRONOUS PRODUCT INSERTION SYSTEM

(75) Inventors: Jack E. Olson; Joe C. Bollinger, both of Tulsa; Willson L. Mayerberg, II, Bartlesville, all of OK (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/843,916

(22) Filed: Apr. 30, 2001

Related U.S. Application Data

(60) Provisional application No. 60/276,786, filed on Mar. 16, 2001.

(51) Int. Cl.[7] ............................................... B65G 43/00
(52) U.S. Cl. ..................................... 198/357; 271/9.13
(58) Field of Search ................................ 198/357, 358, 198/444, 448; 271/9.02, 9.04, 9.13

(56) References Cited

U.S. PATENT DOCUMENTS

| | | |
|---|---|---|
| 3,817,368 A | 6/1974 | Wentz et al. |
| 4,360,098 A | 11/1982 | Nordstrom |
| 4,429,781 A | 2/1984 | Holzhauser |
| 4,792,033 A | 12/1988 | Iwata et al. |
| 4,854,440 A | 8/1989 | Laube et al. |
| 5,267,638 A | 12/1993 | Doane |
| 5,297,667 A | * 3/1994 | Hoffman et al. ......... 198/836.2 |
| 5,782,332 A | 7/1998 | Guidetti et al. |
| 5,860,504 A | 1/1999 | Lazzarotti |
| 5,954,330 A | 9/1999 | Rabindran et al. |
| 6,129,199 A | 10/2000 | Gretener et al. |

* cited by examiner

Primary Examiner—Joseph E. Valenza
(74) Attorney, Agent, or Firm—Schwartz & Weinrieb

(57) ABSTRACT

A conveyor system for synchronously combining the conveying paths of at least two asynchronously operated upstream conveyors for synchronized merger into at least one downstream conveyor comprises a synchronizing conveyor belt disposed upstream of the merger point of the at least two upstream asynchronously operated conveyors. When articles, such as, for example, postal mail pieces being conveyed along the at least two upstream asynchronously operated conveyors are detected as being likely to undergo a collision or overlap at the merge point of the at least two upstream asynchronously operated conveyors, the synchronizing conveyor belt is appropriately sped up or slowed down so as to not only avoid such interference, collision, or overlap of the postal mail pieces, but in addition, to provide sufficient spacing of the same upon the at least one downstream conveyor.

25 Claims, 5 Drawing Sheets

DYNAMIC GAP ESTABLISHING SYNCHRONOUS PRODUCT INSERTION SYSTEM

CROSS-REFERENCE TO RELATED PATENT APPLICATIONS

This patent application is related to U.S. Provisional Patent Application Serial No. 60/276,786 which was filed on Mar. 16, 2001 in the name of Jack E. Olson et al.

FIELD OF THE INVENTION

The present invention relates generally to article conveyor systems, and more particularly to a new and improved article conveyor system which is used to convert a plurality of different streams of conveyed articles or products which are being conveyed along a plurality of relatively asynchronous or unrelated conveyance paths, into a single stream of conveyed articles or products which are thereby being conveyed along a single synchronous conveyance path as a result of a portion of one of the conveyance paths, disposed upstream from an intersection, junction, or convergence point of any two of the conveyance paths, being in effect controlled in an adaptive manner with respect to its conveyance speed such that the articles or products being conveyed along the different unrelated or asynchronous conveyance paths are able to be smoothly integrated with respect to each other along the converged or downstream synchronous flow path whereby no interference between, or overlap of, the conveyed articles or products occurs.

BACKGROUND OF THE INVENTION

In connection with the conveyance of various different products or articles, such as, for example, individual postal mail units or pieces, the articles or products are often initially conveyed along different asynchronous or unrelated flow paths, and it is ultimately desired to integrate such different asynchronous or unrelated flow paths into a single integrated or synchronous flow path such that the multiplicity of articles or products, such as, for example, individual postal mail pieces or units, can be serially conveyed so as to undergo further processing within downstream stages, such as, for example, being appropriately scanned, sorted, distributed, and the like. While PRIOR ART conveyor systems have of course been constructed wherein different conveyor paths or streams can in effect be integrated or merged, such PRIOR ART conveyor systems are not capable of being operated in an adaptive mode, that is, the speed of the conveyor, or even that of a particular conveyor section, cannot be automatically controlled as may be required in connection with the integration of the converging conveyor paths. Accordingly, such conveyor systems can only usually be operated at a relatively low rate of speed, and in addition the spacing between the individual articles or products as they are being conveyed upon the conveyor paths must be relatively large, in order to permit the articles or products being conveyed upon one of the conveyor flow paths to be effectively inserted or interdispersed into spaces defined between the articles or products being conveyed upon the other one of the conveyor flow paths so as to achieve the desired convergence or integration of the articles or products from the different conveyor paths without encountering interference between or overlapping of the articles or products. It is therefore apparent that such conventional conveyor systems suffer from or exhibit significant operational drawbacks or disadvantages in that such systems are significantly limited with respect to their operational velocities and product or article throughput volume.

A need therefore exists in the art for a new and improved article or product conveyor system which is an adaptive type article or product conveyor system wherein a plurality of asynchronous article conveyor flow paths can be effectively synchronously integrated together into a single synchronous conveyor flow path so as to permit the articles or products being conveyed upon one of the conveyor flow paths to be effectively inserted or interdispersed into spaces defined between the articles or products being conveyed upon the other one of the conveyor flow paths in accordance with substantially high operating speed and volume throughput parameters and wherein further, the system is capable of achieving the desired convergence or integration of the articles or products from the different conveyor paths without encountering interference between or overlapping of the articles or products.

OBJECTS OF THE INVENTION

Accordingly, it is an object of the present invention to provide a new and improved article or product conveyor system.

Another object of the present invention is to provide a new and improved article or product conveyor system which effectively overcomes the various operational disadvantages and drawbacks characteristics of PRIOR ART article conveyor systems.

An additional object of the present invention is to provide a new and improved article or product conveyor system which is an adaptive type article or product conveyor system.

A further object of the present invention is to provide a new and improved article or product conveyor system which is an adaptive type article or product conveyor system wherein a plurality of asynchronous article conveyor flow paths can be effectively synchronously integrated together into a single conveyor flow path so as to permit the articles or products being conveyed upon one of the conveyor flow paths to be effectively inserted or interspersed into spaces defined between the articles or products being conveyed upon the other one of the conveyor flow paths in accordance with substantially high operating speed and volume throughput parameters.

A last object of the present invention is to provide a new and improved article or product conveyor system which is an adaptive type article or product conveyor system wherein a plurality of asynchronous article conveyor flow paths can be effectively synchronously integrated together into a single synchronous conveyor flow path so as to permit the articles or products being conveyed upon one of the conveyor flow paths to be effectively inserted or interspersed into spaces defined between the articles or products being conveyed upon the other one of the conveyor flow paths in accordance with substantially high operating speed and volume throughput parameters, and wherein further, the system is capable of achieving the desired convergence or integration of the articles or products from the different conveyor paths without encountering interference between or overlapping of the articles or products.

SUMMARY OF THE INVENTION

The foregoing and other objectives are achieved in accordance with the teachings and principles of the present invention through the provision of a new and improved article or product conveyor system which comprises, for example, a plurality of synchronizer units wherein each synchronizer unit effectively achieves synchronization between two asynchronous conveyor flow paths. While the number of conveyor system stages may of course vary as is desired or required, in accordance with the exemplary conveyor system constructed in accordance with the principles and teachings of the present invention, three synchronizer units are utilized so as to achieve synchronization between four originally asynchronous article or product conveyor flow paths. In particular, two upstream synchronizer units are respectively utilized to integrate two pairs of the four originally asynchronous conveyor flow paths into a single pair of intermediate conveyor flow paths, wherein it is to be appreciated that the two intermediate conveyor flow paths are nevertheless asynchronous with respect to each other. Accordingly, a third downstream synchronizer unit is utilized to synchronously integrate the two remaining asynchronous intermediate conveyor flow paths into a single final conveyor flow path.

In order to achieve the aforenoted integration and synchronization of the various article or product conveyor flow paths, a synchronizer unit is incorporated within one of each pair of article or product conveyor systems. More particularly, the synchronizer unit is an adaptive type unit which means that the operative speed of the conveyor section with which the synchronizer unit is operatively associated can be appropriately controlled whereby the operative speed of such conveyor section can be effectively retarded or accelerated as required. In this manner, in order to properly integrate or intermingle the articles or products being conveyed upon any two asynchronous convergent conveyors such that the articles or products do not interfere with or overlap each other, the synchronizer unit or section of the one conveyor is appropriately slowed down or sped up such that the articles or products being conveyed along such conveyor flow path can be properly inserted into spaces defined between articles or products being conveyed along the other one of the conveyor flow paths.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
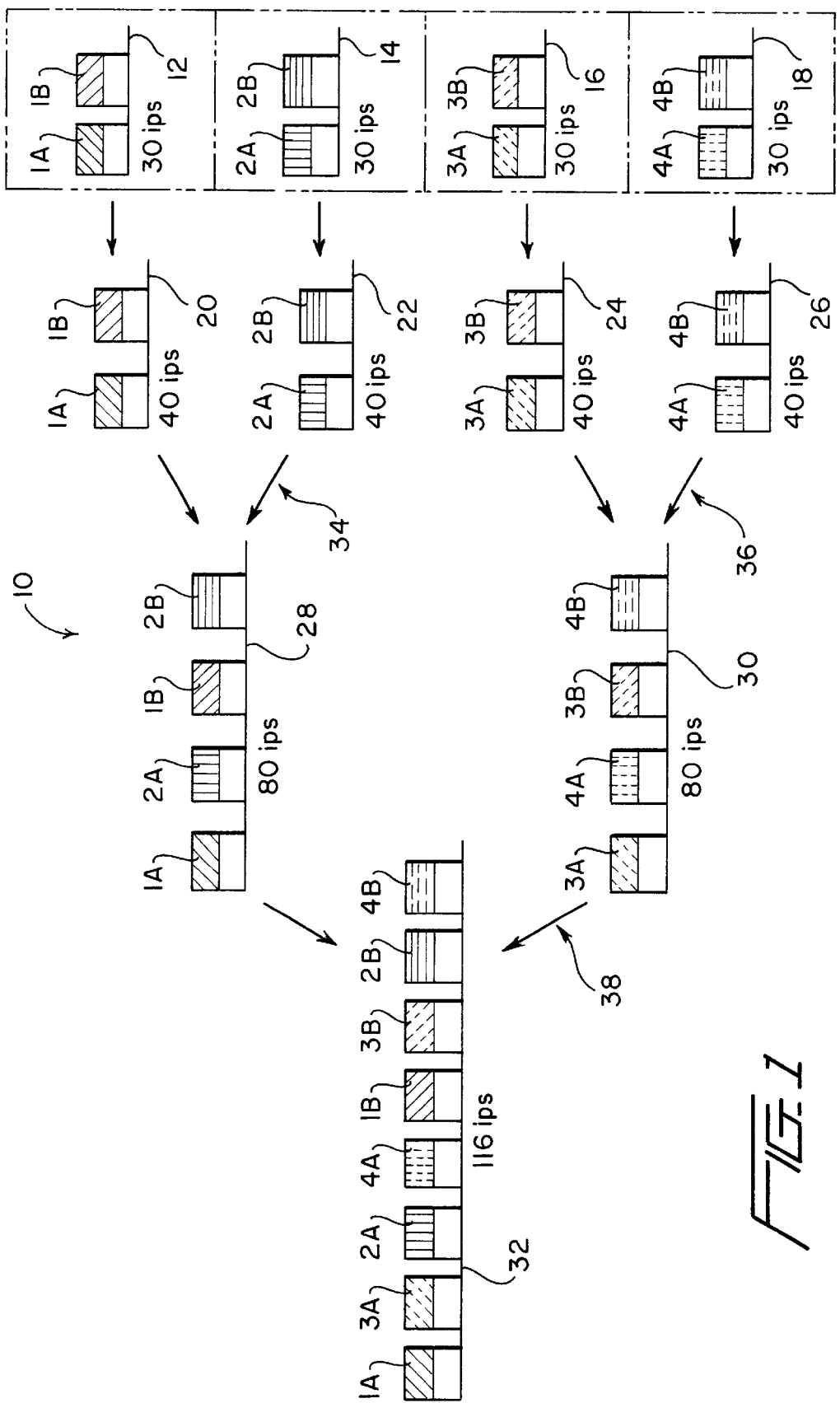
FIG. 1 is a flow diagram schematically showing the overall article or product conveyor system constructed in accordance with the principles and teachings of the present invention wherein, by means of the incorporation of the plurality of adaptive conveyor synchronizer structures into the article or product conveyor system of the present invention, four asynchronous conveyor flow paths are able to be effectively converted into a single synchronous conveyor flow path which exhibits high speed and high volume throughput operative parameters or characteristics.

Referring now to the drawings, and more particularly to FIG. 1 thereof, a new and improved overall article or product conveyor system, constructed in accordance with the principles and teachings of the present invention wherein as a result of the incorporation of a plurality of adaptive conveyor synchronizer structures into such new and improved overall product or article conveyor system a plurality of asynchronous conveyor flow paths are able to be effectively synchronously converted into a single conveyor flow path which exhibits high speed and high volume throughput operative parameters or characteristics, is disclosed and is generally indicated by the reference character 10. It is to be initially appreciated that while the principles and teachings of the present invention may be readily adapted for use in connection with the conveyance of various different articles or products, the new and improved overall product or article conveyor system 10 of the present invention will be disclosed as being used in conjunction with the conveyance of postal mail pieces or units. It is therefore also to be appreciated at this juncture that the overall objective of the present invention is to enable a plurality of article or product conveyor paths, along which postal mail pieces, units, articles, or products are being asynchronously conveyed, to be synchronously merged in accordance with high-speed and high-volume parameters such that the postal mail pieces or units can be serially conveyed in a downstream direction so as to be capable of undergoing further processing such as, for example, sorting, distribution, and the like, without encountering any interference or overlap with respect to each other.

More particularly, then, the new and improved overall product or article conveyor system 10 is seen to comprise a plurality of infeed mechanisms 12,14,16,18 for initially feeding individual postal mail pieces or units. It is seen that the plurality of infeed mechanisms 12,14,16,18 respectively convey or feed the individual postal mail pieces or units at a conveyor speed of, for example, thirty inches per second (30 ips) to a set of four upstream conveyors 20, 22,24,26 which are normally operated in an asynchronous manner with respect to each other. Each one of the four upstream conveyors 20,22,24,26 is respectively operated at a conveyor speed of, for example, forty inches per second (40 ips), and are adapted to convey the individual postal mail pieces or units to a set of two intermediate conveyors 28,30 which are also operated in an asynchronous manner with respect to each other. Each one of the two intermediate conveyors 28,30 is respectively operated at a conveyor speed of, for example, eighty inches per second (80 ips), and are adapted to convey the individual postal mail pieces or units to a final downstream conveyor 32 which is operated at a conveyor speed of, for example, one hundred sixteen inches per second (116 ips). In order to clearly appreciate the operation of the present invention and to in effect be able to keep track of the individual postal mail pieces or units as they are conveyed through the overall conveyor system 10, the individual postal mail pieces or units, initially fed into the overall conveyor system 10 by means of the infeed mechanisms 12,14,16,18, have been specifically noted or designated as mail pieces or units 1A,1B which are fed into the conveyor system 10 by means of infeed mechanism 12, mail pieces or units 2A,2B which are fed into the conveyor system 10 by means of infeed mechanism 14, mail pieces or units 3A, 3B which are fed into the conveyor system 10 by means of the infeed mechanism 16, and mail units or pieces 4A,4B which are fed into the conveyor system 10 by means of the infeed mechanism 18.

The mail pieces or units 1A,1B,2A,2B,3A,3B,4A,4B are then conveyed in the aforenoted order onto and by the set of upstream conveyors 20,22,24,26 wherein each set of mail pieces or units 1A–1B,2A–2B,3A–3B,4A–4B conveyed upon their respective conveyors 20,22,24,26 are conveyed in an asynchronous manner with respect to each other. However, it is to be remembered that in accordance with the primary objective of the present invention, all of the asynchronously movable conveyors 20,22,24,26,28,30 are to be synchronously operated in accordance with high-speed, high-volume throughput parameters such that the mail pieces or units 1A,1B,2A, 2B,3A,3B,4A,4B are able to be conveyed in a synchronously merged or integrated manner whereby all of the mail pieces or units 1A,1B,2A,2B,3A, 3B,4A,4B are ultimately able to be conveyed along the single final conveyor flow path 32. More particularly, as is seen from FIG. 1, when the mail pieces or units 1A,1B,2A, 2B are to be conveyed from the set of upstream conveyors 20,22 to the intermediate conveyor 28, the mail pieces or units 1A,1B,2A,2B are integrated with respect to each other in such a manner that the mail pieces or units 1A,1B,2A,2B are disposed upon conveyor 28 in an alternatively merged mode whereby the mail pieces or units are now disposed in the serial order 1A,2A,1B,2B.

In a similar manner, when the mail pieces or units 3A,3B,4A,4B are to be conveyed from the set of upstream conveyors 24,26 to the intermediate conveyor 30, the mail pieces or units 3A,3B,4A,4B are integrated with respect to each other in such a manner that the mail pieces or units 3A,3B, 4A,4B are disposed upon conveyor 30 in an alternatively merged mode whereby the mail pieces or units are now disposed in the serial order 3A,4A,3B,4B. Still further, the sets of mail pieces or units 1A,2A,1B,2B, and 3A,4A, 3B,4B, are now respectively disposed and conveyed in an asynchronous manner with respect to each other by means of asynchronously operated conveyors 28,30, however, it is again to be remembered that in accordance with the primary objective of the present invention, all of the mail pieces or units 1A,2A,1B, 2B, and 3A,4A,3B,4B are to be conveyed in a synchronously integrated manner. Accordingly, when the sets of mail pieces or units 1A,2A,1B,2B and 3A,4A, 3B,4B are to be conveyed from the asynchronously operated intermediate conveyors 28,30 to the final downstream conveyor 32, the sets of mail pieces or units 1A,2A, 1B,2B and 3A,4A,3B,4B are integrated with respect to each other in such a manner that all of the original mail pieces or units 1A,1B,2A,2B,3A,3B,4A,4B are now disposed upon final downstream conveyor 32 in an alternatively merged mode such that the mail pieces or units now appear in the serial order 1A,3A,2A,4A,1B,3B,2B,4B.

In order to effectively synchronize the conveyance operation of asynchronously operated upstream conveyors 20, 22,24,26 with respect to each other, as well as to similarly effectively synchronize the conveyance operation of asynchronously operated intermediate conveyors 28,30 with respect to each other, so as to ultimately achieve the high-speed, high-volume throughput conveyance of all of the postal mail pieces or units 1A,1B,2A,2B,3A,3B,4A,4B in a synchronized integrated manner, the new and improved conveyor system 10, constructed in accordance with the principles and teachings of the present invention, incorporates therein a plurality of synchronizer units. More particularly, a first synchronizer unit 34 is operatively employed in effect at the intersection, junction, or merge point of the first pair of asynchronously operated upstream conveyors 20,22 in preparation for the continued conveyance of the postal mail units or pieces onto intermediate conveyor 28, a second synchronizer unit 36 is operatively employed in effect at the intersection, junction, or merge point of the second pair of asynchronously operated upstream conveyors 24,26 in preparation for the continued conveyance of the postal mail pieces or units onto intermediate conveyor 30, and a third synchronizer unit 38 is operatively employed in effect at the intersection, junction, or merge point of the pair of asynchronously operated intermediate conveyors 28,30 in preparation for the continued conveyance of the postal mail pieces or units onto the final downstream conveyor 32. It is to be noted in conjunction with the overall conveyor system 10, and particularly in connection with the disclosure of upstream conveyors 20,22, 24,26, intermediate conveyors 28,30, and final downstream conveyor 32, that while the disclosed operation of the overall conveyor system 10 comprises the use of four upstream conveyors 20,22,24,26, two intermediate conveyors 28,30, and a single downstream final conveyor 32, as well as the use of the three synchronizer units 34,36,38 at the noted intersections, junctions, or merge points of the particular conveyor flow paths, the present invention is not limited to such number of disclosed conveyors and synchronizer units. More particularly, any number of upstream and intermediate conveyors can be employed in accordance with the teachings and principles of the present invention, it being remembered that the critical structure of the present invention conveyor system 10 resides in the utilization of a conveyor synchronizer unit at the junction, intersection, or merge point of any two asynchronously operated conveyors. It is also to be noted that all of the synchronizer units 34,36,38 are structurally the same, and accordingly, the following description of one of the synchronizer units is applicable to any one of the synchronizer units 34,36,38.

Figure 2:
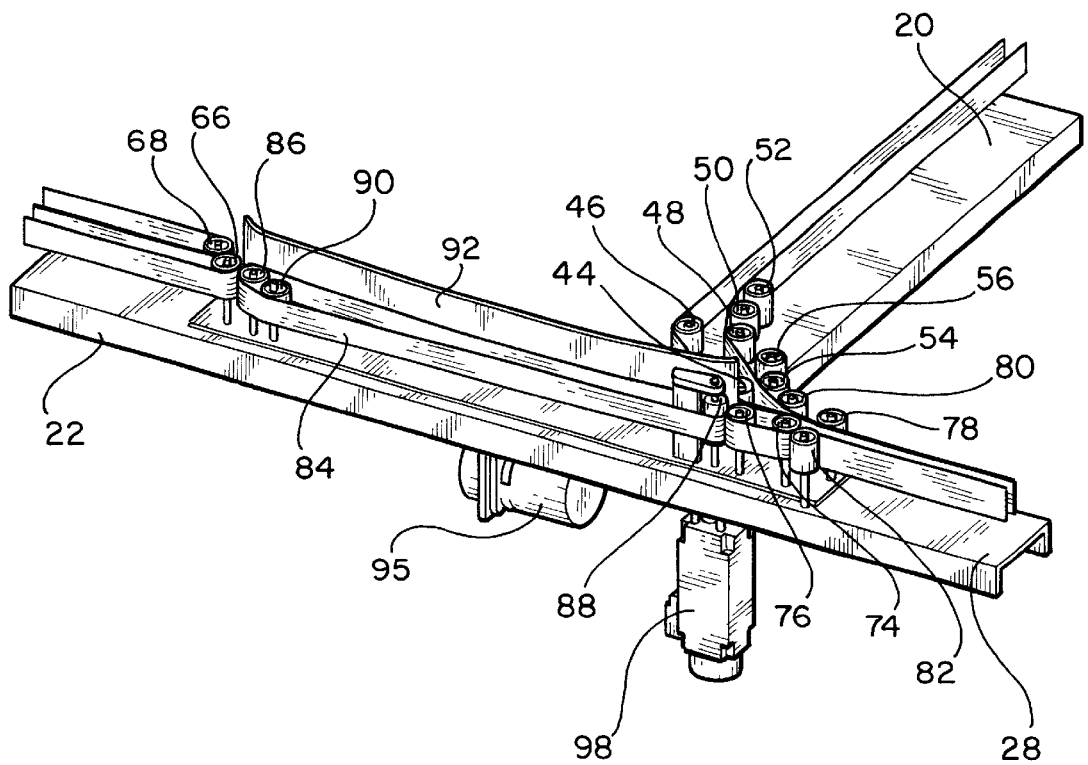
FIG. 2 is a perspective view, of a portion of the overall article or product conveyor system as shown in FIG. 1, specifically disclosing the use of a synchronizer unit upon, for example, one of the secondary conveyor flow paths at a location upstream of the convergence, junction, or intersection point of such secondary conveyor flow path with a primary conveyor flow path in order to synchronize the conveyed flow of articles or products along the asynchronous primary and secondary conveyor flow paths.
Figure 3:
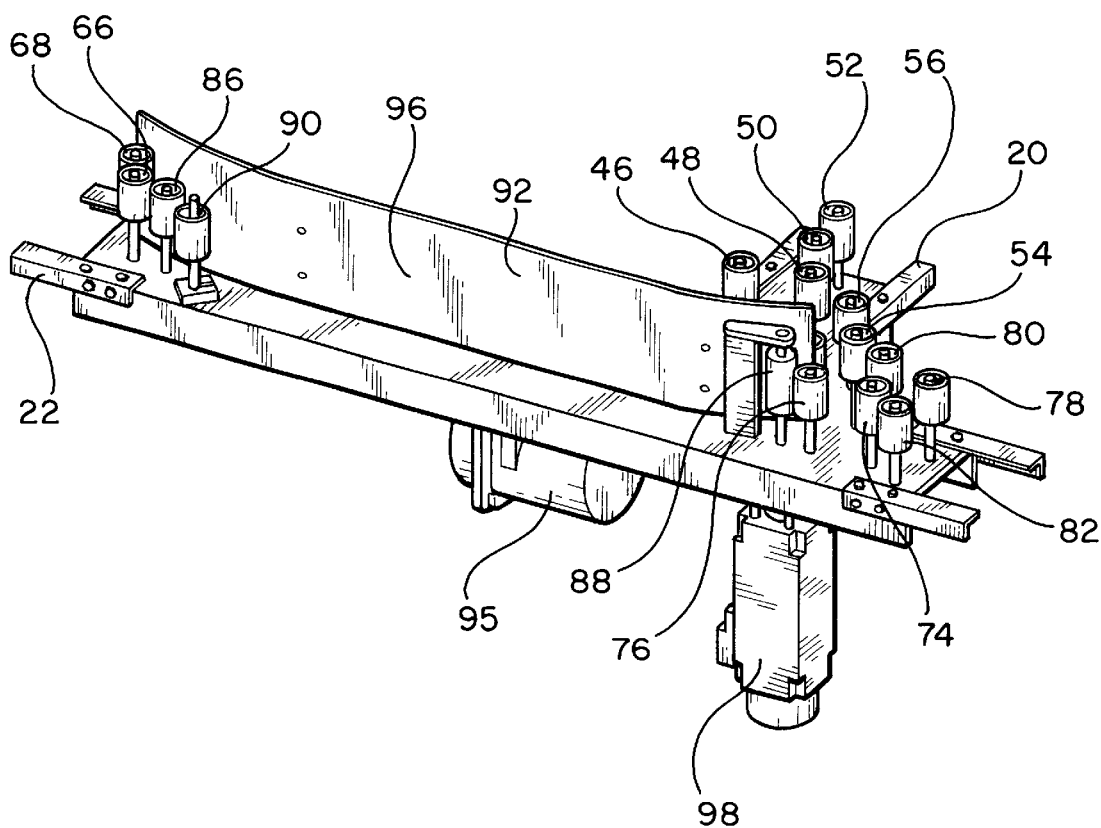
FIG. 3 is a perspective view similar to that of FIG. 2 showing, however, that portion of the overall article or product conveyor system with the conveyor belts removed for additional clarity and for illustrating the front face of the air plenum-guide plate structure wherein an array of air holes are provided therein for the discharge of air flows used to force conveyed articles or products, such as, for example, pieces or units of postal mail, into contact with the synchronizer conveyor belt as well as to in effect form an air bearing along or upon which the pieces or units of postal mail are smoothly conveyed.
Figure 4:
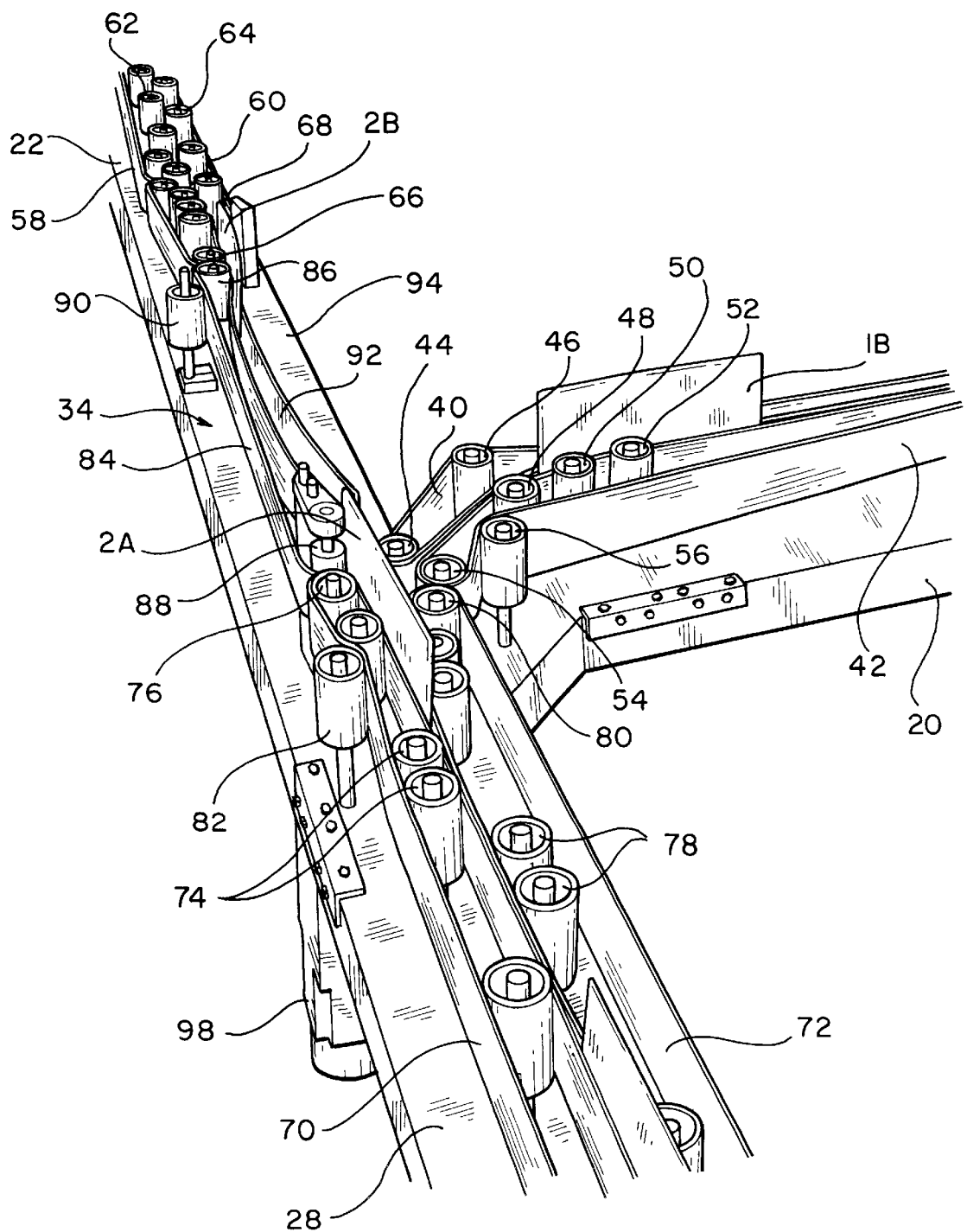
FIG. 4 is a perspective view similar to that of FIG. 2 showing, however, in greater detail, that portion of the overall article or product conveyor system wherein it is illustrated how the individual pieces or units of postal mail are conveyed and synchronized between the two primary and secondary conveyor flow paths.

Referring then to FIGS. 2–4, a synchronizer unit as used in conjunction with, or at the intersection, merge, or junction point of any two of the aforenoted asynchronously operated conveyors 20,22, or 24,26, or 28,30, will now be described. More particularly, for illustrative and descriptive purposes only, the use of synchronizer unit 34 as used in conjunction with asynchronously operated upstream conveyors 20,22 will be described, it again being understood that the description of such synchronizer unit 34 and its use in connection with the noted asynchronously operated conveyors 20,22 is equally applicable to any one of the other pairs of asynchronously operated conveyors 24,26 or 28, 30. Accordingly, as best seen in FIGS. 2–4, the first one of the asynchronously operated upstream conveyors 20 will be designated as the primary conveyor, the second one of the asynchronously operated upstream conveyors 22 will be designated as the secondary conveyor, and it is seen that the first intermediate conveyor 28, in connection with which the asynchronously operated upstream conveyors 20,22 will be effectively synchronously merged as will be described hereinafter, is also disclosed. FIG. 4 discloses the disposition of the conveyed postal mail pieces or units at an intermediate time frame of the conveying process wherein, for example, the second postal mail piece or unit 2A from the secondary upstream conveyor 22 is shown as being already disposed upon the intermediate conveyor 28, the second postal mail piece or unit 1B which is originally disposed upon the primary upstream conveyor 20 is also shown in FIG. 4, and the second postal mail piece or unit 2B is likewise disclosed as being disposed upon the secondary upstream conveyor 22.

More particularly, as best seen in FIG. 4, the primary upstream conveyor 20 has a pair of conveyor belts 40,42 movably mounted thereon such that the juxtaposed runs of the conveyor belts 40,42 define a conveyor path therebetween along which the second postal mail piece or unit 1B is able to be conveyed. As can be seen, the conveyor belt 40 is routed around a downstream end roller 44, and the return portion of the conveyor belt 40 is passed around an idler roller 46. In a similar manner, the internal run of the conveyor belt 42 is routed along a plurality of idler rollers 48,50,52, and the conveyor belt 42 is also routed around a downstream end roller 54. A tension-adjuster roller 56 is disposed externally of the return run of the conveyor belt 42. In connection with the secondary upstream conveyor 22, there is similarly provided a pair of conveyor belts 58,60 such that the internal runs of the conveyor belts 58,60 define a conveyor flow path along which the second postal mail piece or unit 2B can be conveyed. Each one of the conveyor belts 58,60 is respectively routed along a set of idler conveyor rollers 62,64, and the conveyor belt 58 is routed around a downstream end roller 66 while the conveyor belt 60 is similarly routed around a downstream end roller 68. Still yet further, the intermediate conveyor 28 is seen to comprise a pair of conveyor belts 70,72 wherein the inner flow paths of the conveyor belts 70,72 are juxtaposed together so as to convey, for example, the first postal mail piece or unit 2A as has been previously noted. The conveyor belt 70 is conveyed along a plurality of idler rollers 74 and around an upstream end roller 76, while the conveyor belt 72 is similarly conveyed along a plurality of idler rollers 78 and around an upstream end roller 80. A tension adjuster roller 82 is operatively disposed in connection with the external run of the conveyor belt 70.

As can therefore be readily appreciated from FIGS. 1 and 4, and in accordance with the teachings and principles of the present invention, it is desired to convey the various different postal mail pieces or units, as exemplified by means of the illustrated postal mail pieces or units 2A,1B,2B, in a serially integrated manner from both of the primary and secondary upstream conveyors 20,22, and in order to achieve such synchronized serial integration of the postal mail pieces or units, the synchronizer unit 34 is employed, for example, in connection with, or in effect as an extension of, the downstream conveyor end of the secondary upstream conveyor 22. The synchronizer unit 34 is seen to comprise a single conveyor belt 84 which is routed around an upstream idler roller 86 and which is driven by means of a downstream drive roller 88. A tension adjuster roller 90 is disposed externally of the conveyor belt 84 at a position adjacent to the upstream idler roller 86. A guide plate 92 is disposed opposite the inner surface of the inner run of the single conveyor belt 84, and the guide plate 92 forms a front face of an air plenum 94 which is supplied with air from a suitable blower or other type of air supply 95.

As best seen in FIG. 3, the guide plate 92 is provided with a plurality of through-holes 96 which are arranged within a substantially rectangular array, and the plurality of through-holes 96 are fluidically connected to the air plenum 94 such that a plurality of air streams issue from the guide plate 92 wherein the air streams are directed toward and tend to impinge upon the inner surface of the inner run of the conveyor belt 84. This impingement of the air streams upon the inner surface of the inner run of the conveyor belt 84 serves two purposes. Firstly, when a mail unit or piece, such as, for example, mail piece or unit 2B, is conveyed in the downstream direction from secondary upstream conveyor 22, the mail piece or unit 2B will enter the space defined between the guide plate 92 and the inner run of the synchronizer conveyor belt 84. The plurality of air streams issuing from the plurality of through-holes 96 will therefore force the mail piece or unit 2B into engagement with the inner run of the synchronizer conveyor belt 84 and will also maintain the mail piece or unit 2B in such engaged state whereby the mail piece or unit 2B will in effect adhere to the synchronizer conveyor belt 84 so as to be conveyed therewith. Secondly, since only one surface of the mail piece or unit 2B is engaged with the synchronizer conveyor belt 84, the other surface of the mail piece or unit 2B is in effect disposed upon a cushion of air. The cushion of air therefore serves in effect as an air bearing along which the mail piece or unit 2B can be easily conveyed in an extremely low-friction state and with a relatively high rate of speed. This dual function of the air streams in connection with the synchronizer conveyor belt 84 is critically important to the achievement of the increase in speed, as may be necessary, of the mail pieces or units conveyed by means of the synchronizer conveyor belt 84 in order to attain the desired synchronization of the primary and secondary upstream conveyors 20,22.

In accordance with the unique conveyor structure characteristic of the present invention, and in order to implement or achieve the aforenoted objectives of the present invention, the synchronizer conveyor belt drive roller 88 is operatively connected to a servo motor 98. The servo motor 98 can therefore cause the synchronizer conveyor belt drive roller 88 to rotate at variable speeds in order to, in turn, cause synchronizer conveyor belt 84 to move at various different speeds. Accordingly, it can be readily appreciated that in order to properly synchronize the conveyance of the primary and secondary upstream conveyors 20,22, the synchronizer conveyor belt 84 is varied in speed by means of the servo motor 98 in order to appropriately speed up or slow down the conveyance speed of the synchronizer conveyor belt 84. In this manner, the system 10 is able to properly intersperse postal mail pieces or units from primary upstream conveyor 20 with or relative to postal mail pieces or units from secondary upstream conveyor 22 as has been illustrated in effect in FIG. 4 comprising the disposition of mail pieces or units 2A,1B, and 2B.

Figure 5:
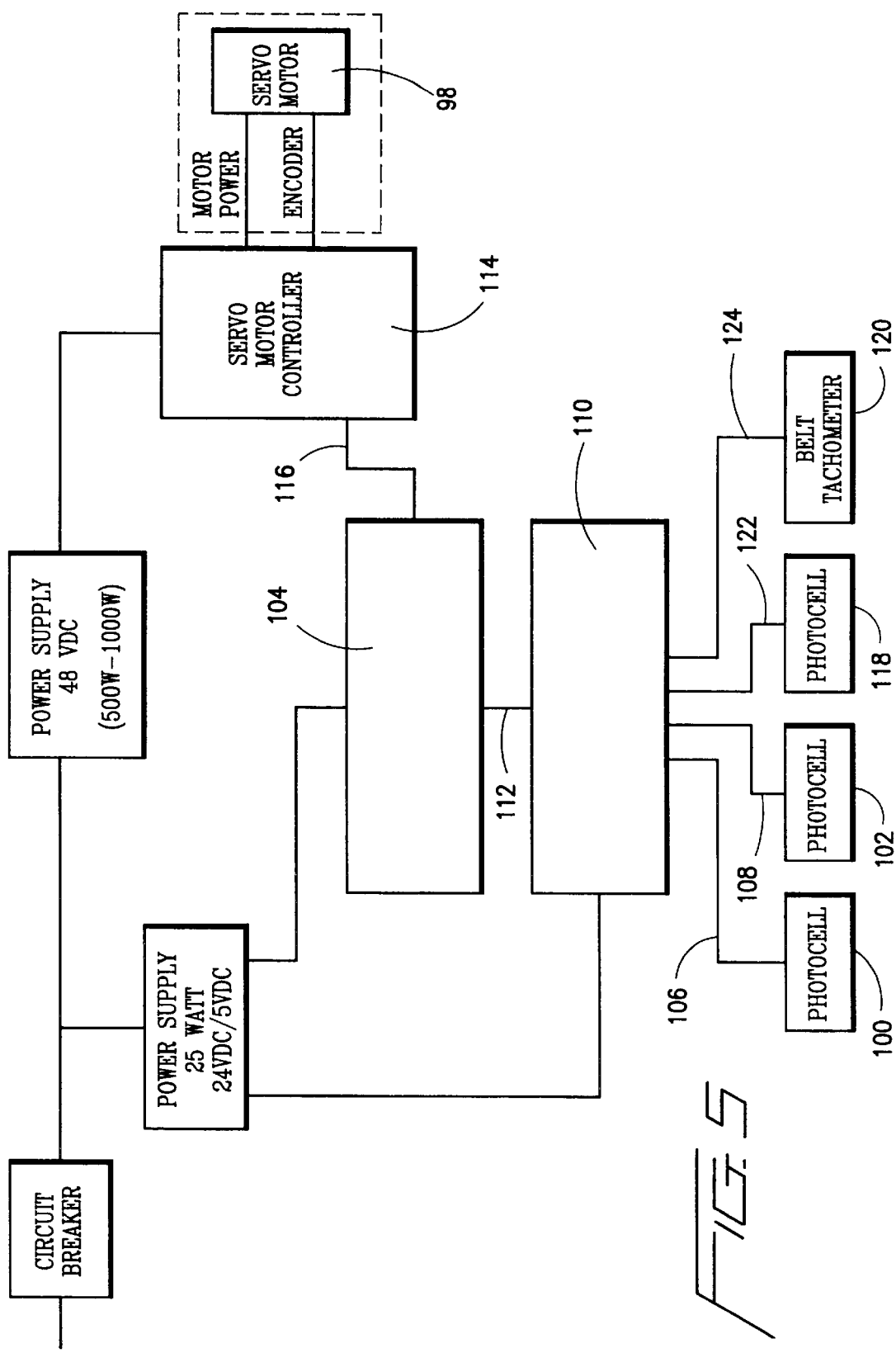
FIG. 5 is a simplified electrical circuit diagram illustrating the electrical connections defined between the various operative components of the new and improved article or product conveyor system constructed in accordance with the principles and teachings of the present invention, particularly the plurality of photocells, the secondary conveyor tachometer, and the synchronizer conveyor unit servo motor and controller.

In order to achieve such variable control of the servo motor 98, and therefore of the conveyance speed of the synchronizer conveyor belt 84, a first photocell 100, as illustrated in FIG. 5, is disposed at a predetermined location along the primary upstream conveyor 20, and at a predetermined distance from the merge point of the primary and secondary upstream conveyors 20,22, so as to detect the presence of postal mail pieces or units as such mail pieces or units pass the photocell 100 during conveyance of the same along primary upstream conveyor 20. In a similar manner, a second photocell 102 is similarly disposed at a predetermined location along the secondary upstream conveyor 22, and at a predetermined distance from the merge point of the primary and secondary upstream conveyors 20,22 which corresponds to the predetermined distance of the first photocell 100 from the merge point of the primary and secondary upstream conveyors 20,22, so as to detect the presence of postal mail pieces or units as such mail pieces or units pass the photocell 102 during conveyance of the same along secondary upstream conveyor 22. Photocells 100 and 102 are electronically connected to a display processor card or central processing firmware unit 104, by means of circuit lines 106,108 which pass through a signal conditioning card 110, in view of the fact that the display processor card or central processing firmware unit 104 is soldered atop the signal conditioning card 110. The central processing firmware unit 104 is operatively connected back to the signal conditioning card 110, through means of a circuit 112, the signal conditioning card 110 being used to convert electronic signals from the display processor card or central processing firmware unit 104 from 24V to 5V. The operative control signals generated from signal conditioning card 110 are transmitted to a servo motor controller 114, which is also equipped with firmware, along line 116, and the servo motor controller 114 is operatively connected to the servo motor 98.

Still further, a third photocell 118 is disposed at a predetermined location along the synchronizer conveyor belt 84 so as to detect the presence of postal mail pieces or units as such mail units or pieces pass the photocell 118 during conveyance of the same along synchronizer conveyor belt 84 of synchronizer unit 34, and a tachometer 120 is similarly disposed at a predetermined location along the secondary upstream conveyor 22 downstream of the second photocell 102. In this manner, the tachometer 120 operatively cooperates with the second photocell 102 so as to effectively assist the display processor card or central processing firmware unit 104 in constantly maintaining surveillance or positional awareness of the disposition of mail pieces or units being conveyed along the secondary upstream conveyor 22 as will be more fully explained hereinafter. The third photocell 118 and the tachometer 120 are electronically connected to the display processor card or central processing firmware unit 104 by means of circuits 122,124, respectively, such that appropriate control signals can be subsequently generated from signal conditioning card 110 in order to appropriately actuate servo motor controller 114 and servo motor 98.

In operation, in accordance with the unique and novel principles and teachings of the present invention, and with specific reference being again made to FIGS. 1 and 4, when mail pieces or units are being conveyed along the primary and secondary upstream conveyors 20,22, the first and second photocells 100 and 102 detect the presence of, for example, mail pieces or units 1B and 2A. It is also to be remembered that the primary and secondary upstream conveyors 20,22 are operated at the same conveying speeds, and that, for example, at least the secondary upstream conveyor 22 is electronically connected to the display processor card or central processing firmware unit 104 such that the display processor card or central processing firmware unit 104 always knows the operating speed of the secondary upstream conveyor 22. In addition, the predetermined distance of the photocells 100,102 from the merge point of the primary and secondary upstream conveyors 20,22 is also programmed into the display processor card or central processing firmware unit 104. Therefore, as a result of the positional detection and disposition of such mail pieces or units 1B and 2A along their respective primary and secondary upstream conveyors 20,22, should a collision or interference between such mail pieces or units 1B and 2A, at the junction or merge point of the primary and secondary conveyors 20,22 as the mail pieces or units 1B and 2A are to be conveyed onto intermediate conveyor 28, be determined to be likely, the system 10 will take appropriate corrective action so as to ensure that not only will such interference or overlap between the mail unit or pieces 1B and 2A not occur, but that in addition, sufficient spacing of such mail pieces or units 1B and 2A along intermediate conveyor 28 will be provided. Accordingly, as may be readily appreciated, three different major types of operational scenarios involving such aforenoted interference or overlap of the mail pieces or units 1B,2A, that obviously need to be operationally resolved, are possible, with further minor variations or gradations of course being additionally possible.

More particularly, for example, a first possible major operational scenario comprises the instance wherein the two particular mail pieces or units 1B and 2A are being conveyed along their respective primary and secondary upstream conveyors 20,22 in such a manner that the first and second photocells 100,102 detect the fact that a dead-on collision or overlap will occur between the mail pieces or units 1B and 2A when such mail pieces or units 1B and 2A reach the junction or merge point of the primary and secondary upstream conveyors 20,22 in preparation for conveyance onto or along intermediate conveyor 28. This information is of course conveyed to the firmware incorporated within the display processor card or central processing unit 104. At the same time, the tachometer 120, operatively associated with the secondary upstream conveyor 22, is activated by means of the photocell 102 so as to transmit timed or periodic signals to the display processor card or central processing unit 104. Since the display processor card or central processing firmware unit 104 knows the speed of the secondary upstream conveyor 22, and the distance of the second photocell 102 from the junction or merge point of the secondary upstream conveyor 22 with respect to the primary upstream conveyor 20, or more particularly, the distance of the mail piece or unit 2A from such junction or merge point of the secondary upstream conveyor 22 with respect to the primary upstream conveyor 20 as a result of the detection of the mail piece or unit 2A by means of the second photocell 102, the display processor card or central processing firmware unit 104 can effectively maintain surveillance or positional awareness of the disposition of mail piece or unit 2A being conveyed along the secondary upstream conveyor 22 in view, or as a result of the correlation, of such conveyor speed and mail piece distance information with the signals being received from tachometer 120.

In this manner, the display processor card or central processing unit 104 can generate a suitable signal, which is transmitted by means of the signal conditioning card 110, for actuating the servo motor controller 114 which in turn controls the operation of the servo motor 98. Accordingly, servo motor 98 suitably controls the synchronizer conveyor belt 84 so as to increase the conveying speed of the synchronizer conveyor belt 84 whereby the conveyance of mail piece or unit 2A will be rapidly increased. In this manner, the mail piece or unit 2A will not only in effect be disposed ahead of the mail piece or unit 1B, being conveyed along primary upstream conveyor 20, once the mail piece or unit 1B reaches the merge point or junction of the primary upstream conveyor 20 with the secondary upstream conveyor 22 as defined by the upstream end of the intermediate conveyor 28, but in addition, the mail piece or unit 2A will be disposed far enough ahead of the mail piece or unit 1B such that when the mail pieces or units 2A and 1B are then conveyed onto intermediate conveyor 28, as shown in FIG. 1, sufficient spacing between the mail pieces or units 2A and 1B will have been achieved. Obviously, once the mail piece or unit 2A being conveyed along the synchronizer conveyor belt 84 has in fact been conveyed or transferred onto intermediate conveyor 28, synchronizer conveyor belt 84 is returned to its normal rate of speed which corresponds to that of the primary and secondary upstream conveyors 20,22.

Continuing further, a second possible major operational scenario comprises the instance wherein the two particular mail pieces or units 1B and 2A are being conveyed along their respective primary and secondary upstream conveyors 20,22 in such a manner that the first and second photocells 100,102 detect the fact that a slight collision or overlap will occur between the mail pieces or units 1B and 2A, when such mail pieces or units 1B and 2A reach the junction or merge point of the primary and secondary upstream conveyors 20,22 in preparation for conveyance onto or along intermediate conveyor 28, in such a manner that the mail piece or unit 2A disposed upon the secondary upstream conveyor 22 will be slightly ahead of the mail piece or unit 1B disposed upon the primary upstream conveyor 20. In accordance with this scenario, the operation of the system 10 is basically the same as has just been described with respect to the dead-on collision or overlap of the mail pieces or units 1B,2A, except that in the present instance, the servo motor 98 is actuated so as to speed up synchronizer conveyor belt 84 to a lesser degree than that required in the aforenoted instance comprising a dead-on collision between the mail pieces or units 1B,2A. It can be further appreciated that depending upon the detected degrees of impending collision or overlap between the mail pieces or units 1B,2A, minor adjustments, variations, or gradations in the operating speed of the synchronizer conveyor 84 will be implemented by means of the servo motor 98.

Lastly, a third possible major operational scenario comprises the instance wherein two particular mail pieces or units 1B and 2B are being conveyed along their respective primary and secondary upstream conveyors 20,22 in such a manner that the first and second photocells 100,102 detect the fact that a slight collision or overlap will occur between the mail pieces or units 1B and 2B, when such mail pieces or units 1B and 2B reach the junction or merge point of the primary and secondary upstream conveyors 20,22 in preparation for conveyance onto or along intermediate conveyor 28, in such a manner that the mail piece or unit 2B disposed upon the secondary upstream conveyor 22 will be slightly behind the mail piece or unit 1B disposed upon the primary upstream conveyor 20. In this instance, since the disposition of the mail piece or unit 2B being conveyed along the secondary upstream conveyor 22 relative or with respect to the mail piece or unit 1B being conveyed along primary upstream conveyor 20 need only in effect be slightly delayed, the conveying speed of synchronizer conveyor belt 84 is maintained the same as that of the primary and secondary upstream conveyors 20,22 until the leading or front edge portion of the mail piece or unit 2B is detected by means of the third photocell 118 operatively disposed in connection with the synchronizer conveyor belt 84. When the leading or front edge portion of the mail piece or unit 2B is so detected, then the synchronizer conveyor belt 84 is sufficiently reduced in speed such that the mail piece or unit 2B will not only be disposed behind the mail piece or unit 1B when such mail units or pieces 1B,2B are disposed upon the intermediate conveyor 28, but appropriate spacing between the mail pieces or unit 1B,2B will have been achieved. After a predetermined period of time, or after, for example, the trailing or rear edge portion of the mail piece or unit 2B has cleared the photocell 118, the synchronizer conveyor belt 84 is returned to its normal rate of speed corresponding to that of the first and second upstream conveyor belts 58,60 and 40,42. Again, it is to be further appreciated that depending upon the detected degrees of impending collision or overlap between the mail pieces or units 1B,2B, minor adjustments, variations, or gradations in the operating speed of the synchronizer conveyor 84 will be implemented by means of the servo motor 98.

Thus, it may be seen that in accordance with the principles and teachings of the present invention, there has been developed a new and improved conveyor system which is particularly adapted for the high-speed, high-volume conveyance of postal mail pieces or units in such a manner that asynchronously operated conveyors can be synchronously controlled such that mail pieces or units being originally conveyed upon such asynchronously operated conveyors can be integrated into a single flow of conveyed mail pieces or units without encountering any interference or overlap between the mail pieces or units.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. An article conveyor system, comprising:
   at least two upstream conveyors wherein each one of said at least two upstream conveyors respectively conveys a plurality of serially spaced articles along an upstream conveyor path;
   at least one downstream conveyor onto which the plurality of serially spaced articles, conveyed along each one of said at least two upstream conveyor paths, can be deposited for conveyance along said at least one downstream conveyor;
   said at least two upstream conveyors being adapted to have said upstream conveyor paths converge at a merge point so as to convey their respective serially spaced articles onto said at least one downstream conveyor;
   means for detecting the presence of the plurality of serially spaced articles upon each one of said at least two upstream conveyors at predetermined locations along said each one of said at least two upstream conveyor paths and for generating signals indicative of the detected presence of the plurality of serially spaced articles at said predetermined locations along said each one of said at least two upstream conveyor paths; and
   a single synchronizer means operatively associated with only one of said at least two upstream conveyors for adaptively varying the conveying speed of only said only one of said at least two upstream conveyors by selectively speeding up and slowing down said conveying speed of said only one of said at least two upstream conveyors in response to said signals indicative of the presence of the plurality of serially spaced articles at said predetermined locations along said each one of said at least two upstream conveyor paths in order to synchronize the conveyance of the plurality of serially spaced articles disposed upon said conveyor paths of said at least two upstream conveyors whereby the plurality of serially spaced articles, originally disposed upon said upstream conveyor paths of said at least two upstream conveyors, are able to be conveyed onto said at least one downstream conveyor without experiencing any spatial interference between any of the plurality of serially spaced articles as the plurality of serially spaced articles are conveyed onto said at least one downstream conveyor from said at least two upstream conveyors.

2. The conveyor system as set forth in claim 1, wherein:
said single synchronizer means is disposed upstream of said merge point defined between said at least two upstream conveyors so as to synchronously control the conveyance of the plurality of the serially spaced articles disposed upon said conveyor paths of said at least two upstream conveyors whereby the plurality of the serially spaced articles, originally disposed upon said upstream conveyor paths of said at least two upstream conveyors, can be conveyed onto said at least one downstream conveyor in an integrated serial manner.

3. The conveyor system as set forth in claim 1, wherein:
said single synchronizer means is disposed upstream of said merge point defined between said at least two upstream conveyors so as to synchronously control the conveyance of the plurality of the serially spaced articles disposed upon said conveyor paths of said at least two upstream conveyors whereby the plurality of the serially spaced articles, originally disposed upon said upstream conveyor paths of said at least two upstream conveyors, can be conveyed onto said at least one downstream conveyor in an integrated alternative serial manner.

4. The conveyor system as set forth in claim 1, wherein:
said at least two upstream conveyors comprises four upstream conveyors arranged in two pairs of upstream conveyors with said two pairs of upstream conveyors defining first and second merge points;
said at least one downstream conveyor comprises a pair of intermediate conveyors and a final downstream conveyor;
said pair of intermediate conveyors respectively defining intermediate conveyor paths disposed downstream of said first and second merge points of said two pairs of upstream conveyors and onto which the plurality of serially spaced articles, conveyed along each one of said four upstream conveyor paths, can be deposited for conveyance along said intermediate conveyor flow paths, and said pair of intermediate conveyors being adapted to have said intermediate conveyor paths converge at a third merge point so as to convey their respective serially spaced articles onto said final downstream conveyor which is located downstream of said third merge point; and
said single synchronizer means comprises a single synchronizer conveyor unit respectively located upstream of each one of said first, second, and third merge points respectively defined between each one of said two pairs of upstream conveyors, and between said pair of intermediate conveyors.

5. The conveyor system as set forth in claim 1, wherein said single synchronizer means comprises:
a synchronizer conveyor belt section incorporated within one of said at least two upstream conveyors; and
a servo motor operatively connected to said synchronizer conveyor belt section of said one of said at least two upstream conveyors for adaptively varying the conveying speed of said synchronizer conveyor belt section of said one of said at least two upstream conveyors so as to synchronize the conveyance of the plurality of serially spaced articles disposed upon said conveyor paths of said at least two upstream conveyors.

6. The conveyor system as set forth in claim 5, wherein said means for detecting the presence of the plurality of the serially spaced articles upon each one of said at least two upstream conveyors at said predetermined locations along said each one of said at least two upstream conveyor paths comprises:
a first photocell detector operatively associated with a first one of said at least two upstream conveyors for respectively detecting the presence of the plurality of serially spaced articles being conveyed along said first one of said at least two upstream conveyors and for generating first signals respectively indicative of the detected presence of the plurality of serially spaced articles being conveyed along said first one of said at least two upstream conveyors;
a second photocell detector operatively associated with a second one of said at least two upstream conveyors for respectively detecting the presence of the plurality of serially spaced articles being conveyed along said second one of said at least two upstream conveyors and for generating second signals respectively indicative of the detected presence of the plurality of serially spaced articles being conveyed along said second one of said at least two upstream conveyors; and
a central processing unit for receiving said first and second signals from said first and second photocell detectors so as to determine the likelihood of a collision between respective ones of the plurality of serially spaced articles being conveyed along said first and second upstream conveyors as a result of said first and second signals from said first and second photocell detectors and for controlling said servo motor in order to adaptively vary said conveying speed of said synchronizer conveyor belt in a speedup mode and thereby avoid any spatial interference between respective ones of the plurality of serially spaced articles being conveyed along said first and second upstream conveyors.

7. The conveyor system as set forth in claim 6, further comprising:
a tachometer operatively associated with said second one of said at least two upstream conveyors and said second photocell detector for generating signals to said central processing unit after respective ones of the plurality of serially spaced articles being conveyed along said second one of said at least two upstream conveyors are detected by said second photocell detector so as to permit said central processing unit to respectively maintain surveillance of the disposition of the plurality of serially spaced articles being conveyed along said second one of said at least two upstream conveyors and thereby control said servo motor at a predetermined time in order to adaptively control the speed of said synchronizer conveyor belt.

8. The conveyor system as set forth in claim 6, further comprising:
   a third photocell detector operatively associated with said synchronizer conveyor belt for respectively detecting the presence of the plurality of serially spaced articles being conveyed along said second one of said at least two upstream conveyors and for generating third signals, respectively indicative of the detected presence of the plurality of serially spaced articles being conveyed along said synchronizer conveyor belt, to said central processing unit for controlling said servo motor in order to adaptively vary said conveying speed of said synchronizer conveyor belt in a slow-down mode and thereby avoid any spatial interference between the plurality of serially spaced articles being conveyed along said first and second upstream conveyors.

9. The conveyor system as set forth in claim 5, further comprising:
   said synchronizer conveyor belt comprises a single synchronizer conveyor belt defining a single conveyor run along which, the plurality of serially spaced articles being conveyed along said second upstream conveyor, are conveyed; and
   an air plenum disposed opposite said single conveyor run of said single synchronizer conveyor belt for pneumatically forcing the plurality of serially spaced articles, being conveyed along said second upstream conveyor, into contact with said single conveyor run of said single synchronizer conveyor belt such that the plurality of serially spaced articles are conveyed upon an air bearing extending along said single conveyor run of said single synchronizer conveyor belt.

10. An article conveyor system for conveying postal mail pieces, comprising:
   at least two upstream conveyors wherein each one of said at least two upstream conveyors respectively conveys a plurality of serially spaced postal mail pieces along an upstream conveyor path;
   at least one downstream conveyor onto which the plurality of serially spaced postal mail pieces, conveyed along each one of said at least two upstream conveyor paths, can be deposited for conveyance along said at least one downstream conveyor;
   said at least two upstream conveyors being adapted to have said upstream conveyor paths converge at a merge point so as to convey their respective serially spaced postal mail pieces onto said at least one downstream conveyor;
   means for detecting the presence of the plurality of serially spaced postal mail pieces upon each one of said at least two upstream conveyors at predetermined locations along said each one of said at least two upstream conveyor paths and for generating signals indicative of the detected presence of the plurality of serially spaced postal mail pieces at said predetermined locations along said each one of said at least two upstream conveyor paths; and
   a single synchronizer means operatively associated with only one of said at least two upstream conveyors for adaptively varying the conveying speed of only said only one of said at least two upstream conveyors by selectively speeding up and slowing down said conveying speed of said only one of said at least two upstream conveyors in response to said signals indicative of the presence of the plurality of serially spaced postal mail pieces at said predetermined locations along said each one of said at least two upstream conveyor paths in order to synchronize the conveyance of the plurality of serially spaced postal mail pieces disposed upon said conveyor paths of said at least two upstream conveyors whereby the plurality of serially spaced postal mail pieces, originally disposed upon said upstream conveyor paths of said at least two upstream conveyors, are able to be conveyed onto said at least one downstream conveyor without experiencing any spatial interference between any of the plurality of serially spaced postal mail pieces as the plurality of serially spaced postal mail pieces are conveyed onto said at least one downstream conveyor from said at least two upstream conveyors.

11. The conveyor system as set forth in claim 10, wherein:
   said single synchronizer means is disposed upstream of said merge point defined between said at least two upstream conveyors so as to synchronously control the conveyance of the plurality of the serially spaced postal mail pieces disposed upon said conveyor paths of said at least two upstream conveyors whereby the plurality of the serially spaced postal mail pieces, originally disposed upon said upstream conveyor paths of said at least two upstream conveyors, can be conveyed onto said at least one downstream conveyor in an integrated serial manner.

12. The conveyor system as set forth in claim 10, wherein:
   said single synchronizer means is disposed upstream of said merge point defined between said at least two upstream conveyors so as to synchronously control the conveyance of the plurality of the serially spaced postal mail pieces disposed upon said conveyor paths of said at least two upstream conveyors whereby the plurality of the serially spaced postal mail pieces, originally disposed upon said upstream conveyor paths of said at least two upstream conveyors, can be conveyed onto said at least one downstream conveyor in an integrated alternative serial manner.

13. The conveyor system as set forth in claim 10, wherein:
   said at least two upstream conveyors comprises four upstream conveyors arranged in two pairs of upstream conveyors with said two pairs of upstream conveyors defining first and second merge points;
   said at least one downstream conveyor comprises a pair of intermediate conveyors and a final downstream conveyor;
   said pair of intermediate conveyors respectively defining intermediate conveyor paths disposed downstream of said first and second merge points of said two pairs of upstream conveyors and onto which the plurality of serially spaced postal mail pieces, conveyed along each one of said four upstream conveyor paths, can be deposited for conveyance along said intermediate conveyor flow paths, and said pair of intermediate conveyors being adapted to have said intermediate conveyor paths converge at a third merge point so as to convey their respective serially spaced postal mail pieces onto said final downstream conveyor which is located downstream of said third merge point; and
   said single synchronizer means comprises a single synchronizer conveyor unit respectively located upstream of each one of said first, second, and third merge points respectively defined between each one of said two pairs of upstream conveyors, and between said pair of intermediate conveyors.

14. The conveyor system as set forth in claim 10, wherein said single synchronizer means comprises:

a synchronizer conveyor belt section incorporated within one of said at least two upstream conveyors; and a servo motor operatively connected to said synchronizer conveyor belt section of said one of said at least two upstream conveyors for adaptively varying the conveying speed of said synchronizer conveyor belt section of said one of said at least two upstream conveyors so as to synchronize the conveyance of the plurality of serially spaced postal mail pieces disposed upon said conveyor paths of said at least two upstream conveyors.

15. The conveyor system as set forth in claim 14, wherein said means for detecting the presence of the plurality of the serially spaced articles upon each one of said at least two upstream conveyors at said predetermined locations along said each one of said at least two upstream conveyor paths comprises:

a first photocell detector operatively associated with a first one of said at least two upstream conveyors for respectively detecting the presence of the plurality of serially spaced postal mail pieces being conveyed along said first one of said at least two upstream conveyors and for generating first signals respectively indicative of the detected presence of the plurality of serially spaced postal mail pieces being conveyed along said first one of said at least two upstream conveyors;

a second photocell detector operatively associated with a second one of said at least two upstream conveyors for respectively detecting the presence of the plurality of serially spaced postal mail pieces being conveyed along said second one of said at least two upstream conveyors and for generating second signals respectively indicative of the detected presence of the plurality of serially spaced postal mail pieces being conveyed along said second one of said at least two upstream conveyors; and a central processing unit for receiving said first and second signals from said first and second photocell detectors so as to determine the likelihood of a collision between respective ones of the plurality of serially spaced postal mail pieces being conveyed along said first and second upstream conveyors as a result of said first and second signals from said first and second photocell detectors and for controlling said servo motor in order to adaptively vary said conveying speed of said synchronizer conveyor belt in a speed-up mode and thereby avoid any spatial interference between respective ones of the plurality of serially spaced postal mail pieces being conveyed along said first and second upstream conveyors.

16. The conveyor system as set forth in claim 15, further comprising:

a tachometer operatively associated with said second one of said at least two upstream conveyors and said second photocell detector for generating signals to said central processing unit after respective ones of the plurality of serially spaced postal mail pieces being conveyed along said second one of said at least two upstream conveyors are detected by said second photocell detector so as to permit said central processing unit to respectively maintain surveillance of the disposition of the plurality of serially spaced postal mail pieces being conveyed along said second one of said at least two upstream conveyors and thereby control said servo motor at a predetermined time in order to adaptively control the speed of said synchronizer conveyor belt.

17. The conveyor system as set forth in claim 15, further comprising:

a third photocell detector operatively associated with said synchronizer conveyor belt for respectively detecting the presence of the plurality of serially spaced postal mail pieces being conveyed along said second one of said at least two upstream conveyors and for generating third signals, respectively indicative of the detected presence of the plurality of serially spaced postal mail pieces being conveyed along said synchronizer conveyor belt, to said central processing unit for controlling said servo motor in order to adaptively vary said conveying speed of said synchronizer conveyor belt in a slowdown mode and thereby avoid any spatial interference between the plurality of serially spaced postal mail pieces being conveyed along said first and second upstream conveyors.

18. The conveyor system as set forth in claim 14, further comprising:

said synchronizer conveyor belt comprises a single synchronizer conveyor belt defining a single conveyor run along which, the plurality of serially spaced postal mail pieces being conveyed along said second upstream conveyor, are conveyed; and an air plenum disposed opposite said single conveyor run of said single synchronizer conveyor belt for pneumatically forcing the plurality of serially spaced postal mail pieces, being conveyed along said second upstream conveyor, into contact with said single conveyor run of said single synchronizer conveyor belt such that the plurality of serially spaced postal mail pieces are conveyed upon an air bearing extending along said single conveyor run of said single synchronizer conveyor belt.

19. A synchronizer system for synchronizing the conveyance of at least two upstream asynchronously operated conveyors wherein each one of the at least two upstream asynchronously operated conveyors respectively conveys a plurality of serially spaced articles along an upstream conveyor path such that the plurality of serially spaced articles being conveyed along the at least two upstream asynchronously operated conveyors can be conveyed onto at least one downstream conveyor disposed at a merge point of the at least two upstream asynchronously operated conveyors, comprising:

means for detecting the presence of the plurality of serially spaced articles upon each one of the at least two upstream conveyors at predetermined locations along each one of the at least two upstream conveyor paths and for generating signals indicative of the detected presence of the plurality of serially spaced articles at said predetermined locations along each one of the at least two upstream conveyor paths; and a single synchronizer means operatively associated with only one of the at least two upstream conveyors for adaptively varying the conveying speed of only the only one of the at least two upstream conveyors by selectively speeding up and slowing down the conveying speed of the only one of the at least two upstream conveyors in response to said signals indicative of the presence of the plurality of serially spaced articles at said predetermined locations along each one of the at least two upstream conveyor paths in order to synchronize the conveyance of the plurality of serially spaced articles disposed upon the conveyor paths of the at least two upstream conveyors whereby the plurality of serially spaced articles, originally disposed upon the upstream conveyor paths of the at least two upstream conveyors, are able to be conveyed onto the at least one downstream conveyor without experiencing any spatial interference between any of the plurality of serially spaced articles as the plurality of serially spaced articles are conveyed onto the at least one downstream conveyor from the at least two upstream conveyors.

20. The synchronizer system as set forth in claim 19, wherein:

said single synchronizer means is disposed upstream of the merge point defined between the at least two upstream conveyors so as to synchronously control the conveyance of the plurality of the serially spaced articles disposed upon the conveyor paths of the at least two upstream conveyors whereby the plurality of the serially spaced articles, originally disposed upon the upstream conveyor paths of the at least two upstream conveyors, can be conveyed onto the at least one downstream conveyor in an integrated serial manner.

21. The synchronizer system as set forth in claim 19, wherein said single synchronizer means comprises:

a synchronizer conveyor belt section incorporated within one of the at least two upstream conveyors; and a servo motor operatively connected to said synchronizer conveyor belt section of the one of the at least two upstream conveyors for adaptively varying the conveying speed of said synchronizer conveyor belt section of the one of the at least two upstream conveyors so as to synchronize the conveyance of the plurality of serially spaced articles disposed upon the conveyor paths of the at least two upstream conveyors.

22. The synchronizer system as set forth in claim 21, wherein in said means for detecting the presence of the plurality of serially spaced articles upon each one of the at least two upstream conveyors at the predetermined locations along each one of the at least two upstream conveyor paths comprises:

a first photocell detector operatively associated with a first one of the at least two upstream conveyors for respectively detecting the presence of the plurality of serially spaced articles being conveyed along the first one of the at least two upstream conveyors and for generating first signals respectively indicative of the detected presence of the plurality of serially spaced articles being conveyed along the first one of the at least two upstream conveyors;

a second photocell detector operatively associated with a second one of the at least two upstream conveyors for respectively detecting the presence of the plurality of serially spaced articles being conveyed along the second one of the at least two upstream conveyors and for generating second signals respectively indicative of the detected presence of the plurality of serially spaced articles being conveyed along the second one of the at least two upstream conveyors; and a central processing unit for receiving said first and second signals from said first and second photocell detectors so as to determine the likelihood of a collision between respective ones of the plurality of serially spaced articles being conveyed along the first and second upstream conveyors as a result of said first and second signals from said first and second photocell detectors and for controlling said servo motor in order to adaptively vary said conveying speed of said synchronizer conveyor belt in a speedup mode and thereby avoid any spatial interference between the plurality of serially spaced articles being conveyed along the first and second upstream conveyors.

23. The synchronizer system as set forth in claim 22, further comprising:

a tachometer operatively associated with the second one of the at least two upstream conveyors and said second photocell detector for generating signals to said central processing unit after respective ones of the plurality of serially spaced articles being conveyed along the second one of the at least two upstream conveyors are detected by said second photocell detector so as to permit said central processing unit to respectively maintain surveillance of the disposition of the plurality of serially spaced articles being conveyed along the second one of the at least two upstream conveyors and thereby control said servo motor at a predetermined time in order to adaptively control the speed of said synchronizer conveyor belt.

24. The synchronizer system as set forth in claim 22, further comprising:

a third photocell detector operatively associated with said synchronizer conveyor belt for respectively detecting the presence of the plurality of serially spaced articles being conveyed along the second one of the at least two upstream conveyors and for generating third signals, respectively indicative of the detected presence of the plurality of serially spaced articles being conveyed along said synchronizer conveyor belt, to said central processing unit for controlling said servo motor in order to adaptively vary said conveying speed of said synchronizer conveyor belt in a slowdown mode and thereby avoid any spatial interference between the plurality of serially spaced articles being conveyed along the first and second upstream conveyors.

25. The synchronizer system as set forth in claim 21, further comprising:

said synchronizer conveyor belt comprises a single synchronizer conveyor belt defining a single conveyor run along which, the plurality of serially spaced articles being conveyed along the second upstream conveyor, are conveyed; and an air plenum disposed opposite said single conveyor run of said single synchronizer conveyor belt for pneumatically forcing the plurality of serially spaced articles, being conveyed along the second upstream conveyor, into contact with said single conveyor run of said single synchronizer conveyor belt such that the plurality of serially spaced articles are conveyed upon an air bearing extending along said single conveyor run of said single synchronizer conveyor belt.

* * * * *